April 23, 1963   J. P. GITS   3,086,245
MOLD FOR MAKING AN INDICIA-BEARING ARTICLE
Filed June 21, 1957   3 Sheets-Sheet 1
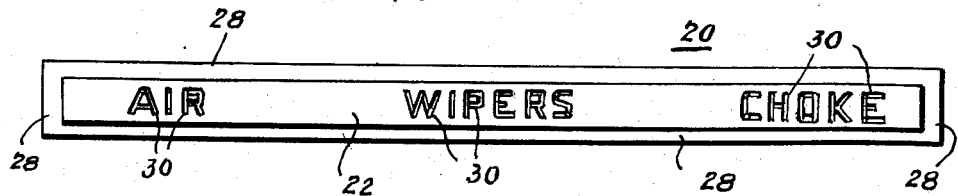
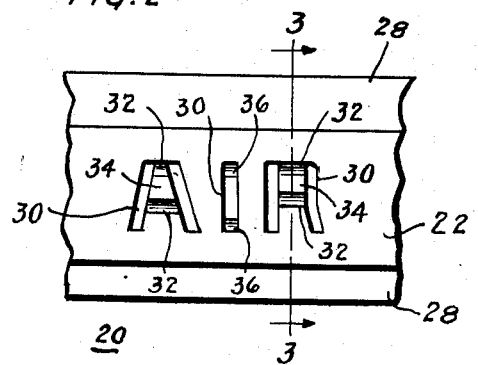
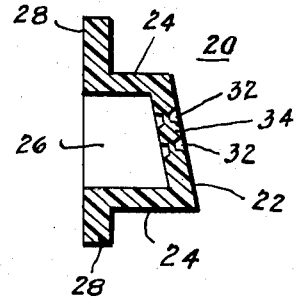
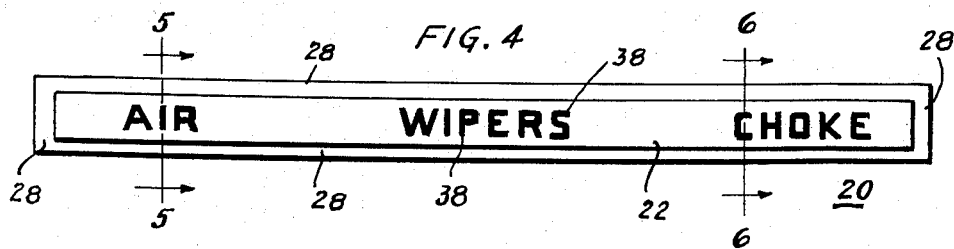
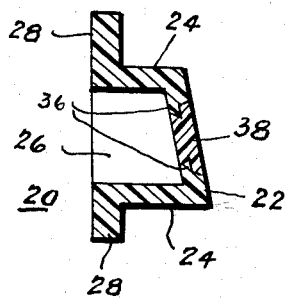
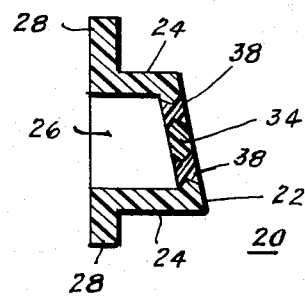
INVENTOR
JULES P. GITS
BY   Ray Eilers ATTY.

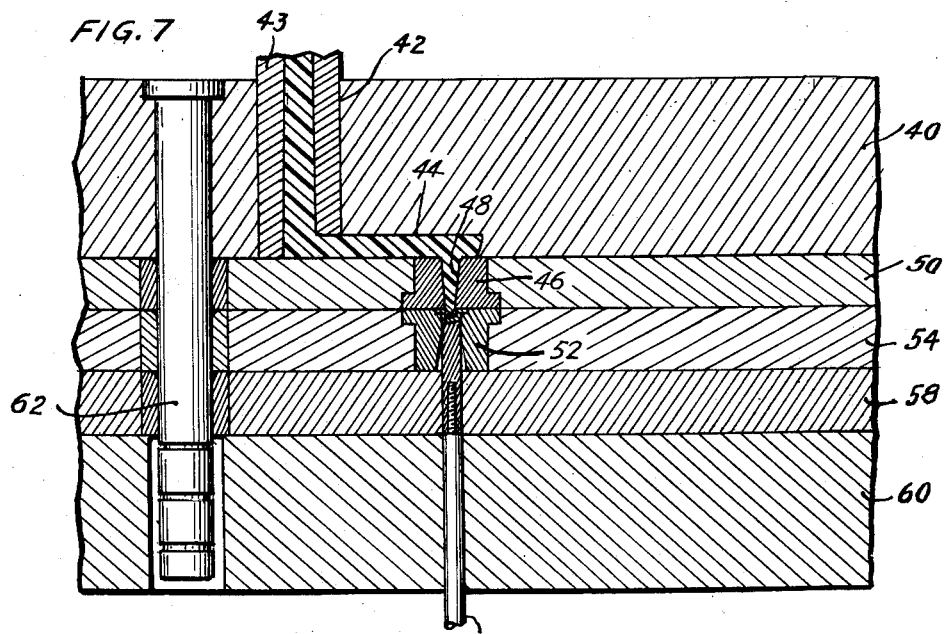
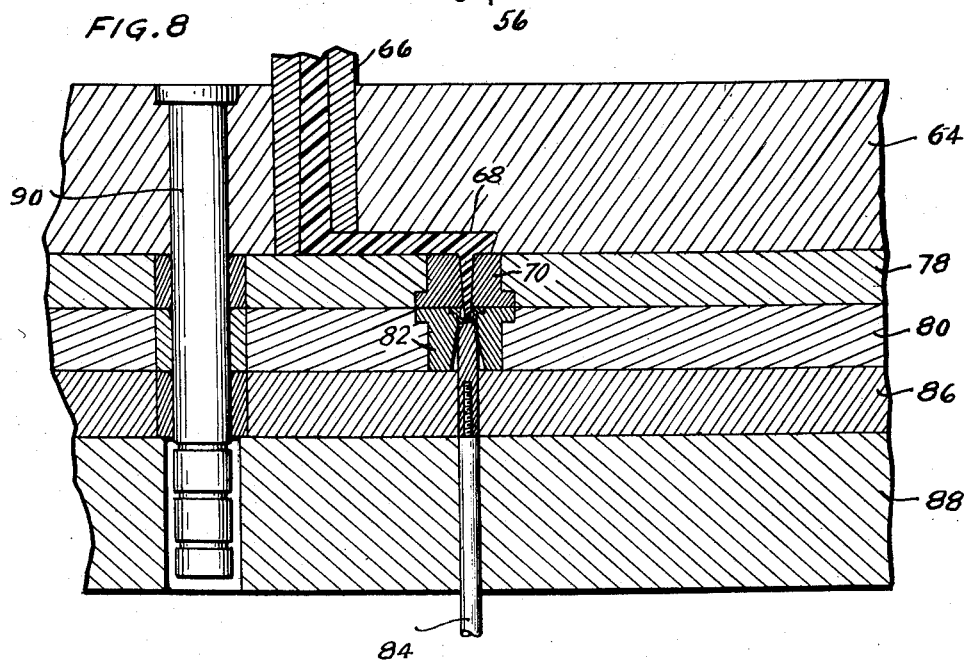

April 23, 1963     J. P. GITS     3,086,245
MOLD FOR MAKING AN INDICIA-BEARING ARTICLE
Filed June 21, 1957     3 Sheets-Sheet 3
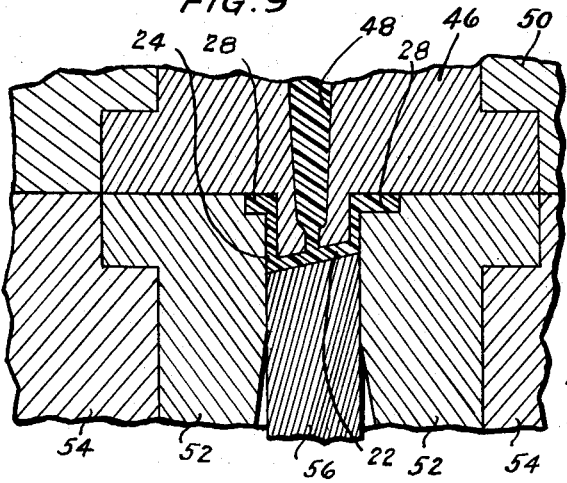
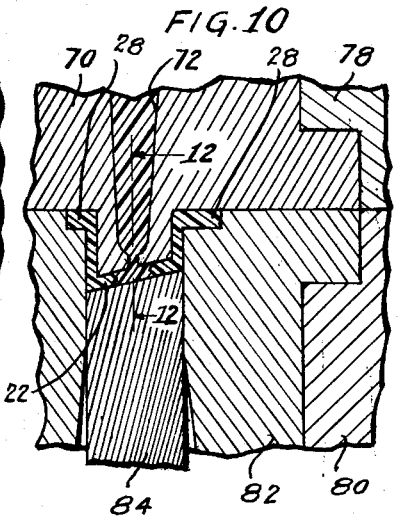
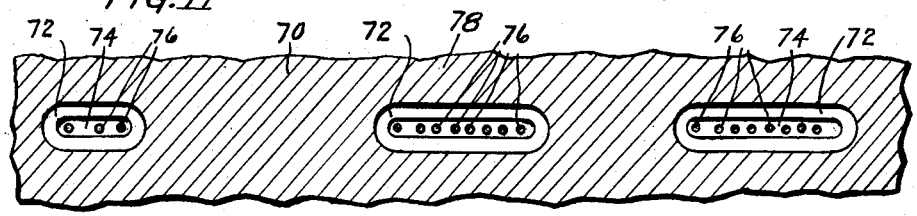
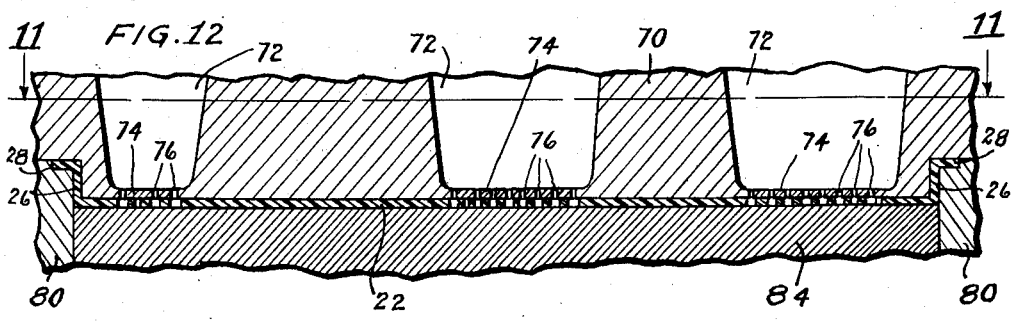
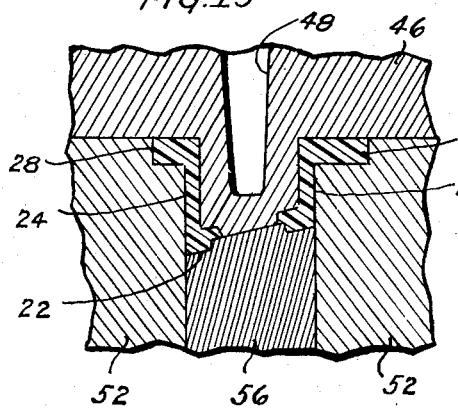
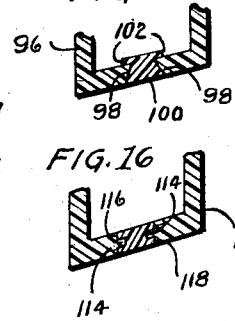
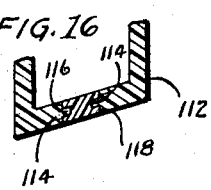
INVENTOR
JULES P. GITS
BY    ATT'Y.

United States Patent Office 3,086,245
Patented Apr. 23, 1963

3,086,245
MOLD FOR MAKING AN INDICIA-BEARING ARTICLE
Jules P. Gits, River Forest, Ill., assignor of one-half to Joseph A. Gits, River Forest, Ill.
Filed June 21, 1957, Ser. No. 667,076
4 Claims. (Cl. 18—36)

This invention relates to improvements in a mold for making an indicia-bearing article. More particularly, this invention relates to improvements in a mold for indicia-bearing articles.

It is frequently desirable to provide molded articles that have differently colored areas to define indicia; and in recognition of this fact, a number of such articles have been proposed. Those articles usually have light-colored areas and dark-colored areas. In some instances, those articles are mounted in front of sources of illumination; and light from those sources is intended to pass through the light-colored areas of those articles. To be effective and attractive, those articles should be formed so the light-colored areas thereof are free of shadows. The light-colored areas are frequently given the configuration of numerals or letters; and where those areas are "open" in nature, it is relatively easy to make those areas shadow-free. Thus, where the light-colored areas have the configuration of the numerals 1, 2, 3, 5 or 7, or have the configuration of the letters C, E, F, G, H, I, J, K, L, M, N, S, T, U, V, W, X, Y or Z, it is relatively easy to make those areas shadow-free. However, where the light-colored areas are given the configuration of numerals or letters that are "closed" in nature, it is not easy to make those areas shadow-free. Thus, where the light-colored areas have the configuration of the numerals, 4, 6, 8, 9 or 0, or have the configuration of the letters A, B, D, O, P, Q or R, it is not easy to make those areas shadow-free.

In molding indicia-bearing articles it is customary to form a "first shot" and then to apply a "second shot" to that "first shot." The "first shot" can be provided with recesses that define the indicia, or it can be made so the indicia are in half relief. Where the indicia are defined by recesses in a dark-colored "first shot," the wholly enclosed areas or "islands" of the indicia must be supported and held by struts, and those struts will be dark-colored and can cast heavy shadows on portions of the light-colored areas in those recesses when the molded articles are trans-illuminated. For example, where the "first shot" is of dark-colored material and is formed to define a recess bounding the outer periphery of an "O," the "island" for the "O" must be held in place by struts; and those struts will be of the same dark-colored material of which the rest of the "first shot" is formed. Consequently, when the light-colored material is disposed in the space defined by the said recess and the said "island," and when a source of illumination is disposed behind the molded article, the struts of the "first shot" can cast heavy shadows on portions of the light-colored area of the indicia. Where the indicia are made in half relief as part of a light-colored "first shot," slots or grooves are usually formed in the face of that "first shot," and those slots or grooves abut the rear portions of the indicia and also open to the front surface of the "first shot," both at points external of the indicia and within the wholly enclosed areas of the indicia. Those slots or grooves permit the molten material of the "second shot," that will harden to form the dark-colored areas, to pass into and fill the wholly enclosed areas of the indicia; and that material will abut and underlie rear portions of the light-colored areas of the indicia and will, when the article is trans-illuminated, cast a heavy shadow upon those portions of the light-colored areas of the indicia.

The present invention makes it possible to form molded, indicia-bearing articles that have "closed" indicia and that are shadow-free. In doing so, the present invention provides molded, indicia-bearing articles that have "closed" shadow-free indicia.

Where the indicia are defined by recesses in a light-colored, thin "first shot," and where the completed article is to be trans-illuminated, it would not be practical to apply the dark-colored material of the "second shot" to the "first shot" by means of a runner that is coextensive with the various indicia-defining recesses and that remains in position. Such a runner would cast heavy shadows on the light-colored, thin "first shot"; and such shadows are objectionable. The present invention obviates any need of a runner that underlies and is coextensive with the indicia-defining recesses and that remains in position; the present invention providing a number of small diameter openings through which small quantities of the "second shot" material pass directly into the indicia-defining recesses of the "first shot." As contemplated by the present invention, there is at least one opening for each separate and distinct indicia-defining recess, and there may be more than one opening for each such recess. In particular, where an indicium is "closed" there will be at least two openings for that indicium. It is therefore an object of the present invention to provide an apparatus for molding indicia-bearing articles wherein the material of the "second shot" is introduced into indicia-defining recesses of the "first shot" through a number of small diameter openings and wherein there is at least one opening for each separate indicia-defining recess.

To make it possible for the material of the "second shot" to pass through a number of small diameter openings and completely fill each and every part of each indicia-defining recess in the "first shot," it is necessary to keep that material sufficiently hot to be fluid until that material has entered and completely filled each and every part of each indicia-defining recess. The present invention makes certain that the material of the "second shot" will remain hot enough to be fluid until it enters and completely fills each and every recess by providing the mold with chambers that hold large masses of the "second shot" material immediately adjacent the "first shot." Thin walls are interposed between those chambers and the "first shot," and the small diameter openings are formed in those walls. The chambers will receive the molten material of the "second shot," and those chambers are formed to provide a large volume-to-surface ratio for the molten material of the "second shot"; that ratio minimizing the cooling rate of that molten material. As a result, the molten material of the "second shot" has a high degree of fluidity, and that material can easily pass through the small diameter openings in the thin walls and completely fill the indicia-defining recesses. After the material of the "second shot" has passed through the openings in the thin walls and has filled each and every part of each recess in the "first shot," the said material will cool and harden. The overall result is that full fluidity is assured for the material of the "second shot" and each of the indicia-defining recesses is filled by material passing through its own opening. It is therefore an object of the present invention to provide a mold with chambers which are separated from the "first shot" by thin walls which have openings therethrough that can direct the molten material of the "second shot" into the indicia-defining recesses of the "first shot."

The walls which separate the chambers from the "first shot" are quite thin. This is desirable because it permits the molten material in the chambers to heat those walls and to keep those walls from "chilling" the molten material as it flows into the indicia-defining recesses. Furthermore, the thinness of those walls makes it possible for the portions of the "second shot" which enter, and lodge in, those openings to be withdrawn from those openings when the mold is opened. This obviates any need of individual ejector pins for the openings. The material of the "second shot" in the openings will break away from the portions of the "second shot" that are embedded in the indicia-defining recesses of the "first shot," and that material will move out of the openings in the thin walls when the excess "second shot" material is ejected from the mold.

The provision of at least one opening for each of the indicia-defining recesses in the "first shot" is desirable because it makes possible the use of very small diameter openings in the thin walls. The smaller the diameters of such openings, the more readily the "second shot" material in those openings can be broken away and separated from the portions of the "second shot" which lodge in the indicia-defining recesses of the "first shot." By having a large number of small diameter openings, and by having at least one opening for each indicia-defining recess of the "first shot," the present invention minimizes the forces applied to the embedded portions of the "second shot" in the recesses of the "first shot."

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

In the drawing,

FIG. 1 is a front elevational view of a "first shot" that is made in accordance with the principles and teachings of the present invention, FIG. 2 is a plan view, on an enlarged scale, of a portion of the "first shot" of FIG. 1, FIG. 3 is a sectional view of the portion of the "first shot" shown in FIG. 2, and it is taken along the plane indicated by the line 3—3 in FIG. 2, FIG. 4 is a front elevational view of the completed molded article, FIG. 5 is a sectional view, on said enlarged scale, of the completed article shown in FIG. 4, and it is taken along the plane indicated by the line 5—5 in FIG. 4, FIG. 6 is another sectional view on said enlarged scale of the completed article shown in FIG. 4, and it is taken along the plane indicated by the line 6—6 in FIG. 4, FIG. 7 is a sectional view through the mold used to form the "first shot" of FIGS. 1–3, FIG. 8 is a sectional view of the mold in which the "second shot" is added to the "first shot" to form the completed article of FIGS. 4–6, FIG. 9 is a sectional view, on an enlarged scale, of a portion of the mold shown in FIG. 7, FIG. 10 is a sectional view on a similarly enlarged scale of a portion of the mold shown in FIG. 8, FIG. 11 is a sectional view in plan, on the enlarged scale of FIG. 10, of a portion of the mold shown in FIG. 10 as that mold appears without the material of the "second shot," and that view is taken along the plane indicated by the line 11—11 in FIG. 12, FIG. 12 is a longitudinal section, on the enlarged scale of FIG. 10, through the mold shown in FIG. 8, and it is taken along the plane indicated by the line 12—12 in FIG. 10, FIG. 13 is a sectional view, on a still larger scale, of the mold in FIG. 7, and it indicates the manner in which the indicia-defining recesses are formed in the "first shot,"

FIG. 14 is a sectional view, on a large scale, of a portion of another modification of the present invention, FIG. 15 is a sectional view, on a large scale, of a portion of still another modification of the present invention, and FIG. 16 is a sectional view, on a large scale, of a portion of yet another modification of the present invention.

Referring to the drawing in detail, the numeral 20 generally denotes a "first shot" that is made in accordance with the principles and teachings of the present invention. That "first shot" will preferably be made of a light-colored plastic material, and it will have a face 22 which is elongated and which is set at an angle, as indicated particularly in FIG. 3. The "first shot" has rearwardly extending side walls 24 that are parallel to each other, and it has rearwardly extending end walls 26 that are parallel to each other. Flanges 28 extend outwardly from the side walls 24 and the end walls 26, and those flanges are continuous. The flanges 28 will underlie the portions of a panel or dashboard which define an opening into which, and through which, the face 22, the side walls 24 and the end walls 26 will extend.

The face 22 has a number of indicia-defining recesses 30 formed therein. In the particular embodiment shown, those indicia are letters which spell out the word "Air," the word "Wipers," and the word "Choke." The side walls of the recesses are defined by surfaces which are inclined relative to the face 22 and which are also inclined relative to each other, as shown particularly in FIGS. 3, 5 and 6. These relatively inclined faces will be formed by confronting die elements that are both engraved.

Where the indicia are "closed," as for example where the indicia consist of the numerals 4, 6, 8, 9 and 0 or where they consist of the letters A, B, D, O, P, Q and R, the "islands" of those indicia must be supported. Struts 32 in the form of "tie-in" are mounted in the areas which will be occupied by the "second shot" in the finished molded article, and those struts will support the "islands." In particular, struts 32 are provided to support the generally triangular "island" of the "A" and to support the generally rectangular "islands" of the "R," the "P" and the "O"; and, as indicated in FIG. 3, the struts 32 are intermediate the front and rear surfaces of the face 22 of the "first shot." This enables the material of the "second shot" to both underlie and overlie the struts 32. Struts 36 are provided in some letters, as for example in the "I" of the word "Air." Those struts are adjacent the rear surface of face 22, and they coact with the inclined sides of the recesses to prevent separation of the "second shot" from the "first shot," and also to prevent straight-line paths for light through the joints between the materials of the "first shot" and of the "second shot."

The material of the "second shot" is denoted by the numeral 38, and that material will fill the recesses in the indicia of the "first shot"; overlying the struts 36 and both overlying and underlying the struts 32. The "second shot" will preferably be of a material that contrasts with the material of the "first shot." For example, where the material of the "first shot" is light-colored, the material of the "second shot" will preferably be dark-colored. In one particular embodiment the "first shot" material has been a translucent white plastic material while the material of the "second shot" has been a black opaque material.

The "first shot" 20 is formed in a mold which includes a runner plate 40. That plate has a cylindrical recess 42 which accommodates a rod 43 with an axial passage for the "first shot" material. A transversely directed passage 44 is formed in the runner plate 40, and that passage communicates with the axial passage in the rod 43. As a result, the material of the "first shot" can pass through the axial passage in the rod 43 and flow into the passage 44 of the runner plate 40. The passage 44 communicates with a sprue 48 in an insert 46, and that insert is held by a supporting plate 50. This sprue conducts the fluid material of the "first shot" to the space in which the "first shot" 20 will be formed. That space lies below a parallelepiped of generally trapezoidal cross section which is part of the insert 46 and which cooperates with a die 56 and an insert 52 to define the recess in which the "first shot" will be formed. The insert 52 is held by a supporting plate 54, and the die 56 has a rod extending rearwardly from it. That rod extends through alined openings in back-up plates 58 and 60 which underlie the supporting plate 54. Both the die 56 and the parallepiped of general trapezoidal cross section are engraved, as shown particularly in FIG. 13, and the engraving on the die 56 and on the said parallepiped coact to form the indicia-defining recesses in the "first shot" 20. An alining rod 62 extends through the runner plate 40 and through bushings in the plates 50, 54 and 58, and extends into a large cylindrical opening in the back-up plate 60.

The material of the "first shot" is introduced into the axial passage of the rod 43 and flows through that axial passage and through the transversely directed passage 44 to the sprue 48. The sprue 48 then conducts the material to the face of the parallelepiped of trapezoidal cross section at the lower face of the insert 46. The plastic material then fills the cavity between that parallelepiped and the insert 52 and the die 56. After the "first shot" has solidified, the runner plate 40 and the supporting plate 50 with its insert 46 will be separated from the supporting plate 54 and its insert 52. Thereupon, ejector pins, not shown, can be operated to free the "first shot" from the insert 52. At this time, the "first shot" will appear as shown in FIGS. 1–3, and it will constitute a unitary molded piece with indicia-defining recesses therein. The "islands" of the "closed" indicia will be supported by the struts 32.

The "first shot" can then be mounted in a mold which includes a runner plate 64 that is comparable to the runner plate 40; and the plate 64 has a cylindrical rod 66 comparable to the rod 43 and has a recess 68 which is comparable to the recess 44. The rod 66 has an axial passage through it, and that passage communicates with the recess 68 in the runner plate 64. Associated with the plate 64 is a supporting plate 78 which receives an insert 70. That insert has a number of relatively large chambers 72, all as shown particularly in FIGS. 11 and 12. The bottoms of the chambers 72 are defined by thin walls 74 which have small diameter openings 76 through them. The chambers 72 are adjacent the recesses which define "CHOKE," "WIPERS," and "AIR." As indicated particularly in FIGS. 11 and 12, there is just one opening 76 for each of the letters of "AIR;" there is just one opening 76 for each of the letters "I," "E" and "S" of "WIPERS" while there are two openings for the "W," "P" and "R" of that word; and there is just one opening 76 for the "C" and "E" while there are two for the "H," "O" and "K." While one opening per letter is all that is needed, two openings for some letters are desirable to reduce the distance the "second shot" material must flow in filling those letters and to assure prompt filling of those letters despite the use of small diameter openings. Each of the walls 74 is quite thin, being about as thick as the face 22; and consequently the openings 76 are short in length.

The insert 70 is held by a supporting plate 78, and that plate underlies runner plate 64. A supporting plate 80 underlies plate 78, and plate 80 holds an insert 82. That insert accommodates a movable die 84 which has a plane, inclined upper face abutting the front of face 22 of the "first shot" 20. The plate 80 is underlain by a back-up plate 86 and a back-up plate 88. An alining rod 90 extends through an opening in runner plate 64 and through bushings in plates 78, 80 and 86 and extends into an oversized opening in plate 88.

The fluid material of the "second shot" is introduced into the axial passage of rod 66, and it flows through that passage and into the transversely directed passage 68 of runner plate 64. That plastic material then enters the chambers 72, and it will remain there until those chambers are filled. Thereupon that material will be forced to subdivide itself into a plurality of jets that pass through the openings 76 in the walls 74. When the material of the "second shot" first enters the chambers 72, it will quickly heat the thin walls 74; and this will enable the jets of "second shot" material to pass through the small diameter openings 76 without "chilling." The masses of "second shot" material will be enabled to have a high degree of fluidity without any need of their being heated unduly, because the chambers 72 provide large volume-to-surface ratios for those masses; and such ratios retard the cooling rates of those masses. The combined action of the chambers 72 and of the walls 74 enables part of the masses of "second shot" material to enter and fill each and every part of each indicia-defining recess.

The "second shot" will flow into recesses 30 of "first shot" 20, and it will underlie and overlie struts 32 and will overlie struts 36. The "second shot" will also intimately engage, and bond to, the inclined sides of the recesses 30; and it will engage the inclined, plane face of the die 84, becoming a part of the smooth flat face of the finished molded article.

After the material of the "second shot" has hardened, runner plate 64 and supporting plate 78 are separated from the plates 80, 86 and 88. As the insert 70 is separated from the plate 80, the solidified jets of "second shot" material will break; and the breaks will occur close to the plane of the rear of face 22. This desirable result is attained by making the openings 76 frusto-conical in configuration and by disposing the smallest cross sections of those openings adjacent the rear of face 22. When the short jets of "second shot" material break, they may break out small parts of the rear of the "second shot" in the indicia-defining recesses, and that is not objectionable; but whether they do or do not break out such small parts, the residuum of the jets will be integral parts of the solidified "second shot" in the chamber 72. Hence, ejection of that material from those chambers will "clear" the openings 76.

Because a large number of small diameter jets are provided between the material in chambers 72 and in recesses 30, the force needed to break any one of those jets is small, and the overall breaking force is not great enough to impair the finished molded article. The struts 32 and 36 and the inclined faces of the recesses 30 help the "second shot" material in the recesses 30 resist dislodgment or breakage due to the said overall breaking forces. Consequently the embedded portions of the "second shot" will remain firmly and positively lodged in position in the recesses 30.

The struts 32 and 36, and the inclined faces of the recesses 30 are also helpful in preventing straight-line paths for light through the joints between the materials of the "first shot" and of the "second shot." In most instances the bonding between the "second shot" material and the "first shot" material will be intimate enough to prevent any leakage of light; but the present invention does not rely solely upon the intimacy of a bond, instead it utilizes the struts 32 and 36 and the inclined faces of the recesses 30 to positively preclude any straight-line paths through the joints between the "second shot" and the "first shot."

It will be noted that the recesses 30 extend all the way from the front to the rear of face 22. This is desirable because it obviates all need of passages within the "first shot" to conduct the "second shot" to those recesses; that "second shot" being directly introduced into those recesses. Any such passages would complicate the task of filling each and every part of each recess 30.

Where desired, the resistance of the embedded "second shot" to dislodgment and the prevention of light-leakage can be effected by giving the sides of the indicia-defining recesses configurations other than those disclosed by FIGS. 5, 6, 10 and 13. For example, in the modification shown in FIG. 14, a "first shot" 96 has an indicia-defining recess with walls 98 that incline toward each other as they extend rearwardly from the front surface of that "first shot." The recess accommodates the "second shot" material 100; and that material forms a flat interlocking portion with edges 102 that underlie the recess-defining portions of the "first shot." The edges 102 prevent forward dislodging movement of the "second shot" 100 and the inclined side walls 98 prevent rearward dislodging movement; and consequently the "second shot" is positively locked in position. The edges 102 also coact with the inclined side walls 98 to prevent any leakage of light through the joint between the "first shot" and "second shot."

FIG. 15 shows a "first shot" 104 which has an indicia-defining recess therein; and that recess has inclined walls 106. Grooves 108 are formed in the "first shot" at the rear surface thereof, and those grooves are contiguous with the indicia-defining recess. When the "second shot" 110 is directed into the indicia-defining recess, the material of that "second shot" will bond to the side wall 106 and will bond to and fill the grooves 108. The side walls 106 and the grooves 108 will interact with the material of the "second shot" to positively prevent dislodgment of the "second shot" or light-leakage through the joints between the "first shot" and the "second shot."

FIG. 16 shows a "first shot" 112 which has an indicia-defining recess therein. That recess has walls 114 which are generally parallel to each other; and the "first shot" has grooves 116 and 118 at the rear and front surfaces thereof, respectively. The grooves 116 and 118 are contiguous with the indicia-defining recess; and therefore when the "second shot" material 120 is introduced into the said recess it will bond to the walls 114 and will fill and bond to the grooves 116. The side walls 114 and the grooves 116 will coact with the "second shot" 120 to positively prevent dislodgment of that "second shot" and also to prevent light-leakage, those walls and grooves constituting aparallel walls.

Whereas several preferred embodiments of the present invention have been shown and described in the drawing and accompanying description, it should be apparent to those skilled in the art that various changes may be made in the form of the invention without affecting the scope thereof.

What I claim is:

1. A mold that can accommodate a "first shot" which has a plurality of individual and discrete indicia-defining recesses in one surface thereof and that can direct molten "second shot" plastic material into said indicia-defining recesses of said "first shot" to form an indicia-bearing molded article and that comprises a mold element which coacts with another mold element to form a cavity to accommodate said "first shot," a normally-empty, unheated chamber to fixed and unvarying dimensions that is within the first said mold element and is close to said cavity and that has a large, unvarying volume-to-surface ratio and that is to be supplied with molten "second shot" plastic material, a passage in the first said mold element which has the outlet end thereof extending to and in communication with said chamber and having the inlet end thereof connectable to a source of molten "second shot" plastic material, whereby said passage can receive molten "second shot" plastic material and can conduct said molten "second shot" plastic material to said chamber, a thin wall of the first said mold element that is intermediate said cavity and said chamber and that directly abuts said surface of said "first shot," said cavity being shallow and having a predetermined height, said thin wall having a thickness close to the height of said cavity, and a plurality of small diameter openings in said thin wall that interconnect said cavity and said chamber, said openings being short and having lengths close to said height of said cavity, said openings being frusto-conical in configuration, said thin wall abutting and overlying those portions of said surface of said "first shot" which define said recesses and said openings being smaller than said recesses whereby said openings can direct molten "second shot" plastic material into said recesses despite lateral displacement of said recesses relative to each other because of shrinkage of said "first shot," said openings having their smallest cross sections immediately adjacent said cavity, said chamber receiving molten "second shot" plastic material from said passage and conducting said molten "second shot" plastic material to said thin wall and holding said molten "second shot" plastic material adjacent said openings in said thin wall so additional molten "second shot" plastic material introduced into said chamber from said passage can cause some of the first said molten "second shot" plastic material to pass through said openings in said thin wall and to enter and fill said recesses in said "first shot," said chamber being elongated and said openings being spaced lengthwise of said chamber to enable the said some of the first said molten "second shot" plastic material from said chamber to enter and fill a plurality of longitudinally-spaced recesses in said "first shot."

2. A mold that can accommodate a "first shot" which has a plurality of individual and discrete indicia-defining recesses therein and that can direct molten "second shot" plastic material into said indicia-defining recesses of said "first shot" to form an indicia-bearing molded article and that comprises a mold element that coacts with another mold element to form a cavity to accommodate said "first shot," a normally-empty, unheated chamber of fixed and unvarying dimensions that is within the first said mold element and is close to said cavity and that is to be supplied with molten "second shot" plastic material, a passage in the first said mold element which has the outlet end thereof extending to and in communication with said chamber and having the inlet end thereof connectable to a source of molten "second shot" plastic material, a thin wall of the first said mold element that is intermediate said cavity and said chamber, said cavity having a predetermined depth, and a plurality of small diameter openings in said thin wall that interconnect said cavity and said chamber, said openings being short and having lengths close to the said depth of said cavity, said openings having their smallest cross sections immediately adjacent said cavity, said chamber being elongated and said openings being spaced lengthwise of said chamber to enable molten "second shot" plastic material from said chamber to enter and fill a plurality of longitudinally-spaced recesses.

3. A mold that can accommodate a "first shot" which has a plurality of individual and discrete indicia-defining recesses in one surface thereof and that can direct molten "second shot" plastic material into said indicia-defining recesses of said "first shot" to form an indicia-bearing molded article and that comprises a mold element which coacts with another mold element to form a cavity to accommodate said "first shot," a normally-empty, unheated chamber of fixed and unvarying dimensions that is within the first said mold element and is close to said cavity, said chamber being elongated and said openings being spaced lengthwise of said chamber to enable molten "second shot" plastic material from said chamber to enter and fill a plurality of longitudinally-spaced recesses, a passage in the first said mold element which has the outlet end thereof extending to and in communication with said chamber and having the inlet end thereof connectable to a source of molten "second shot" plastic material, a thin wall of the first said mold element that is intermediate said cavity and said chamber, said cavity being shallow and having a predetermined height, said thin wall having a thickness close to the height of said cavity, and a plurality of small diameter openings in said thin wall that interconnect said cavity and said chamber, said openings being frusto-conical in configuration, said openings having their smallest cross sections immediately adjacent said cavity.

4. A mold that can accommodate a "first shot" which has a plurality of individual and discrete indicia-defining recesses in one surface thereof and that can direct molten "second shot" plastic material into said indicia-defining recesses of said "first shot" to form an indicia-bearing molded article and that comprises a mold element which coacts with another mold element to form a cavity to accommodate said "first shot," a chamber of fixed and unvarying dimensions that is within the first said mold element and is close to said cavity and that has a large unvarying, volume-to-surface ratio and that is to be supplied with molten "second shot" plastic material, a passage in the first said mold element which has the outlet end thereof extending to and in communication with said chamber and having the inlet end thereof connectable to a source of molten "second shot" plastic material, a thin wall of the first said mold element that is intermediate said cavity and said chamber, said cavity being shallow and having a predetermined height, said thin wall having a thickness close to the height of said cavity, and a plurality of small cross section openings in said thin wall that interconnect said cavity and said chamber, said openings being short and having lengths close to said height of said cavity, said chamber receiving molten "second shot" plastic material from said passage and conducting said molten "second shot" plastic material to said thin wall and holding said molten "second shot" plastic material adjacent said openings in said thin wall so additional molten "second shot" plastic material introduced into said chamber from said passage can cause some of the first said molten "second shot" plastic material to pass through said openings in said thin wall and to enter and fill said recesses in said "first shot," said large volume-to-surface ratio of said chamber coacting with the closeness of said chamber to said cavity to enable the heat of the heated "second shot" plastic material within said chamber to heat said thin wall and thereby keep said thin wall from chilling said some of the first said molten "second shot" material, whereby said some of the first said molten "second shot" material can flow freely through said openings and into said recesses in said "first shot."

References Cited in the file of this patent

UNITED STATES PATENTS

| | | |
|---|---|---|
| 2,241,180 | Burke | May 6, 1941 |
| 2,298,365 | Gits et al. | Oct. 13, 1942 |
| 2,441,988 | Brillhart et al. | May 25, 1948 |
| 2,463,401 | Lyons | Mar. 1, 1949 |
| 2,510,091 | Dofsen et al. | June 6, 1950 |
| 2,544,140 | Dofsen et al. | Mar. 6, 1951 |
| 2,565,803 | Danielson et al. | Aug. 28, 1951 |
| 2,586,978 | Murray | Feb. 26, 1952 |
| 2,663,910 | Danielson et al. | Dec. 29, 1953 |
| 2,725,596 | Weber | Dec. 6, 1955 |
| 2,781,597 | Doane | Feb. 19, 1957 |
| 2,807,564 | Mitchell | Sept. 24, 1957 |
| 2,883,704 | Jurgelert | Apr. 28, 1959 |

FOREIGN PATENTS

| | | |
|---|---|---|
| 521,056 | Great Britain | May 10, 1940 |